US008749476B2

(12) United States Patent
Roh et al.

(10) Patent No.: US 8,749,476 B2
(45) Date of Patent: Jun. 10, 2014

(54) ELECTROPHORETIC DISPLAY DEVICE

(75) Inventors: Nam-Seok Roh, Seongnam-si (KR);
Mun-Pyo Hong, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 1261 days.

(21) Appl. No.: 11/140,850

(22) Filed: May 31, 2005

(65) Prior Publication Data

US 2005/0266590 A1 Dec. 1, 2005

(30) Foreign Application Priority Data

May 28, 2004 (KR) .................. 10-2004-0038311

(51) Int. Cl.
*G09G 3/34* (2006.01)
*G06F 3/042* (2006.01)

(52) U.S. Cl.
USPC .......................................... 345/107; 345/175

(58) Field of Classification Search
USPC ............ 345/36, 48, 63, 77, 84, 89, 103, 104, 345/105, 106, 107, 108, 109, 110, 111, 173, 345/175, 176, 178, 204, 205, 206, 207, 208, 345/209, 210, 211, 214, 690, 691, 692, 345/693; 324/71.1, 96, 750; 358/519; 359/109, 242, 245, 296; 382/169; 178/18.01, 18.02, 18.03, 18.09, 18.11; 430/32

See application file for complete search history.

(56) References Cited

U.S. PATENT DOCUMENTS

| 5,461,400 | A | * | 10/1995 | Ishii et al. ..................... 345/182 |
| 5,550,659 | A | * | 8/1996 | Fujieda et al. .................. 349/12 |
| 6,005,238 | A | * | 12/1999 | Mei et al. ..................... 250/208.1 |
| 6,246,436 | B1 | * | 6/2001 | Lin et al. ....................... 348/308 |
| 6,661,563 | B2 | * | 12/2003 | Hayashi et al. ................ 359/296 |
| 6,947,102 | B2 | * | 9/2005 | den Boer et al. ................ 349/12 |
| 6,995,743 | B2 | * | 2/2006 | Boer et al. ..................... 345/104 |
| 7,009,663 | B2 | * | 3/2006 | Abileah et al. .................. 349/12 |
| 7,045,820 | B2 | * | 5/2006 | Hayashi et al. ................. 257/79 |
| 7,208,718 | B2 | * | 4/2007 | Park et al. ................... 250/214 R |
| 7,218,048 | B2 | * | 5/2007 | Choi et al. ..................... 313/504 |
| 7,248,235 | B2 | * | 7/2007 | Fujii et al. ....................... 345/76 |
| 7,256,764 | B2 | * | 8/2007 | Izumi ............................ 345/104 |
| 7,279,730 | B2 | * | 10/2007 | Pak et al. ...................... 257/291 |

(Continued)

FOREIGN PATENT DOCUMENTS

JP 04054522 2/1992
JP 11015598 1/1999

(Continued)

OTHER PUBLICATIONS

Boer et al. "Active Matrix LCD with Integrated Optical Touch Screen" SID Digest, vol. 34, May 2003, pp. 1494-1497.

*Primary Examiner* — Kent Chang
*Assistant Examiner* — Benjamin Morales Fernande
(74) *Attorney, Agent, or Firm* — Cantor Colburn LLP

(57) ABSTRACT

A electrophoretic display device is provided, which includes: a thin film transistor array panel including a substrate, gate and data lines formed on the substrate and crossing each other, switching thin film transistors electrically connected to the gate and data lines, a photo sensor formed on the substrate, and pixel electrodes electrically connected to the switching thin film transistors; a common electrode panel facing the thin film transistor array panel and having a common electrode; and a display layer disposed between the thin film transistor array panel and the common electrode panel. The display layer includes micro capsules containing negative and positive pigment particles.

7 Claims, 5 Drawing Sheets

(56) References Cited

U.S. PATENT DOCUMENTS

| | | | |
|---|---|---|---|
| 7,280,102 B2* | 10/2007 | Abileah et al. | 345/204 |
| 7,301,524 B2* | 11/2007 | Kawai | 345/107 |
| 7,330,174 B2* | 2/2008 | du Breuil | 345/107 |
| 7,773,139 B2* | 8/2010 | den Boer et al. | 348/302 |
| 2001/0052597 A1* | 12/2001 | Young et al. | 257/59 |
| 2001/0055008 A1* | 12/2001 | Young et al. | 345/204 |
| 2002/0011978 A1* | 1/2002 | Yamazaki et al. | 345/87 |
| 2002/0071074 A1* | 6/2002 | Noritake et al. | 349/112 |
| 2002/0186209 A1* | 12/2002 | Cok | 345/173 |
| 2003/0052869 A1* | 3/2003 | Fujii et al. | 345/204 |
| 2003/0156087 A1* | 8/2003 | Boer et al. | 345/92 |
| 2003/0156230 A1* | 8/2003 | Boer et al. | 349/42 |
| 2003/0173890 A1* | 9/2003 | Yamazaki et al. | 313/498 |
| 2003/0179323 A1* | 9/2003 | Abileah et al. | 349/24 |
| 2003/0179438 A1* | 9/2003 | Yanagawa | 359/296 |
| 2004/0004605 A1* | 1/2004 | David | 345/173 |
| 2004/0046900 A1* | 3/2004 | Boer et al. | 349/43 |
| 2004/0189591 A1* | 9/2004 | Breuil | 345/156 |
| 2004/0263483 A1* | 12/2004 | Aufderheide | 345/173 |
| 2004/0263948 A1* | 12/2004 | Lee et al. | 359/296 |
| 2005/0082968 A1* | 4/2005 | Choi et al. | 313/506 |
| 2005/0116937 A1* | 6/2005 | Choi et al. | 345/173 |
| 2005/0117079 A1* | 6/2005 | Pak et al. | 349/43 |
| 2005/0139751 A1* | 6/2005 | Park et al. | 250/208.1 |
| 2005/0151065 A1* | 7/2005 | Min | 250/214 R |
| 2005/0285985 A1* | 12/2005 | Boer et al. | 349/42 |
| 2006/0060752 A1* | 3/2006 | Lee et al. | 250/208.1 |
| 2006/0077186 A1* | 4/2006 | Park et al. | 345/173 |
| 2006/0118705 A1* | 6/2006 | Eom et al. | 250/221 |
| 2006/0119590 A1* | 6/2006 | Park et al. | 345/175 |
| 2006/0132463 A1* | 6/2006 | Lee et al. | 345/173 |
| 2006/0192215 A1* | 8/2006 | Hayashi et al. | 257/80 |
| 2006/0232506 A1* | 10/2006 | Jeong | 345/60 |
| 2007/0013823 A1* | 1/2007 | Jung et al. | 349/42 |
| 2007/0145893 A1* | 6/2007 | Jung et al. | 313/506 |
| 2007/0171157 A1* | 7/2007 | Choi et al. | 345/81 |
| 2007/0194707 A1* | 8/2007 | Choi | 313/506 |
| 2008/0012999 A1* | 1/2008 | Park et al. | 349/12 |
| 2008/0074401 A1* | 3/2008 | Chung et al. | 345/175 |
| 2008/0122804 A1* | 5/2008 | Kinoshita et al. | 345/175 |

FOREIGN PATENT DOCUMENTS

| | | |
|---|---|---|
| JP | 11073262 | 3/1999 |
| JP | 2000047266 | 2/2000 |
| JP | 2001117069 | 4/2001 |
| JP | 1020030022049 | 3/2003 |
| JP | 2003122496 | 4/2003 |
| JP | 2003256383 | 9/2003 |
| JP | 2003270676 | 9/2003 |
| JP | 1020030073568 | 9/2003 |
| JP | 1020030074472 | 9/2003 |
| KR | 100286945 | 1/2001 |
| KR | 20020007278 | 1/2002 |
| KR | 1020030022049 | 3/2003 |
| KR | 1020030032441 | 4/2003 |
| KR | 1020030073568 | 9/2003 |
| KR | 1020030074472 | 9/2003 |

* cited by examiner

ELECTROPHORETIC DISPLAY DEVICE

The present application claims priority from Korean Patent Application No. 2004-0038311, filed on May 28, 2004, the disclosure of which is hereby incorporated herein by reference in its entirety.

BACKGROUND OF THE INVENTION (a) Field of the Invention

The present invention relates to a display device, and more particularly to an electrophoretic display device.

(b) Description of the Related Art

An electrophoretic display (EPD) is an example of a flat panel display device that is commonly used for electronic books. An EPD device includes two panels having field-generating electrodes and a plurality of micro-capsules interposed between the panels. Each micro-capsule includes electric ink containing a plurality of white and black pigment particles. The white and black pigment particles are oppositely charged such that, for example, all white pigment particles are negatively charged and all black pigment particles are positively charged. Upon application of an electric field to the electrodes, the white and black particles move in opposite directions as determined by the electric field to display images.

The EPD devices have a high reflectance and a high contrast independent of viewing direction. Thus a screen of the EPD is as comfortable to view as a sheet of paper. Since each micro-capsule is stable in either of a black or a white state, each micro-capsule maintains the black or white state without maintaining a voltage across the electrodes. Accordingly, power consumption for the EPD is reduced. In addition, an EPD device is manufactured at a low cost since the EPD devices do not require polarizers, alignment layers, liquid crystal, etc., which are expensive requisites for liquid crystal display devices.

SUMMARY OF THE INVENTION

An electrophoretic display device is provided, which includes: a thin film transistor array panel including a substrate, gate and data lines formed on the substrate and crossing each other, switching thin film transistors electrically connected to the gate and data lines, a photo sensor formed on the substrate, and pixel electrodes electrically connected to the switching thin film transistors; a common electrode panel facing the thin film transistor array panel and having a common electrode; and a display layer disposed between the thin film transistor array panel and the common electrode panel. The display layer includes micro-capsules containing negative and positive pigment particles.

The electrophoretic display device further may comprise an off voltage line and an output scanning line disposed parallel to the gate lines and insulated from the data lines; and a supply voltage line and a signal output line disposed parallel to the data lines and insulated from the gate lines, the off voltage line and the output scanning line.

The photo sensor may include a photo sensing transistor having a control terminal connected to the off voltage lines, and an input terminal connected to the supply voltage lines, and turning on by light incident on a channel of the photo sensing transistor, a signal sensing capacitor having two terminals connected to the output terminal of the photo sensing transistor and the off voltage line, respectively, and an output transistor having an input terminal connected to the output terminal of the photo sensing transistor and one terminal of the signal sensing capacitor, an output terminal connected to the signal output line, and a control terminal connected to the output scanning line.

The photo sensor may include a gate insulating layer insulating the gate lines and the data lines from each other line; and a passivation layer formed on the photo sensing transistor, the output transistor and each switching thin film transistor, and having a light transmissive hole exposing the channel of the photo sensing transistor.

The pixel electrode may include conductive material having a high reflectivity.

An image display device includes a thin film transistor array panel, a common electrode panel and a display layer. The thin film transistor array panel includes a photo sensor and a pixel electrode electrically connected to switching thin film transistors. The common electrode panel faces the thin film transistor array panel and has a common electrode. The display layer is disposed between the thin film transistor array panel and the common electrode panel. The display layer includes micro-capsules containing a plurality of negative and positive pigment particles displaying images responsive to a voltage across the pixel and common electrodes.

BRIEF DESCRIPTION OF THE DRAWINGS

The present invention will become more apparent by describing embodiments thereof in detail with reference to the accompanying drawings in which.

DETAILED DESCRIPTION OF THE INVENTION

Figure 1:
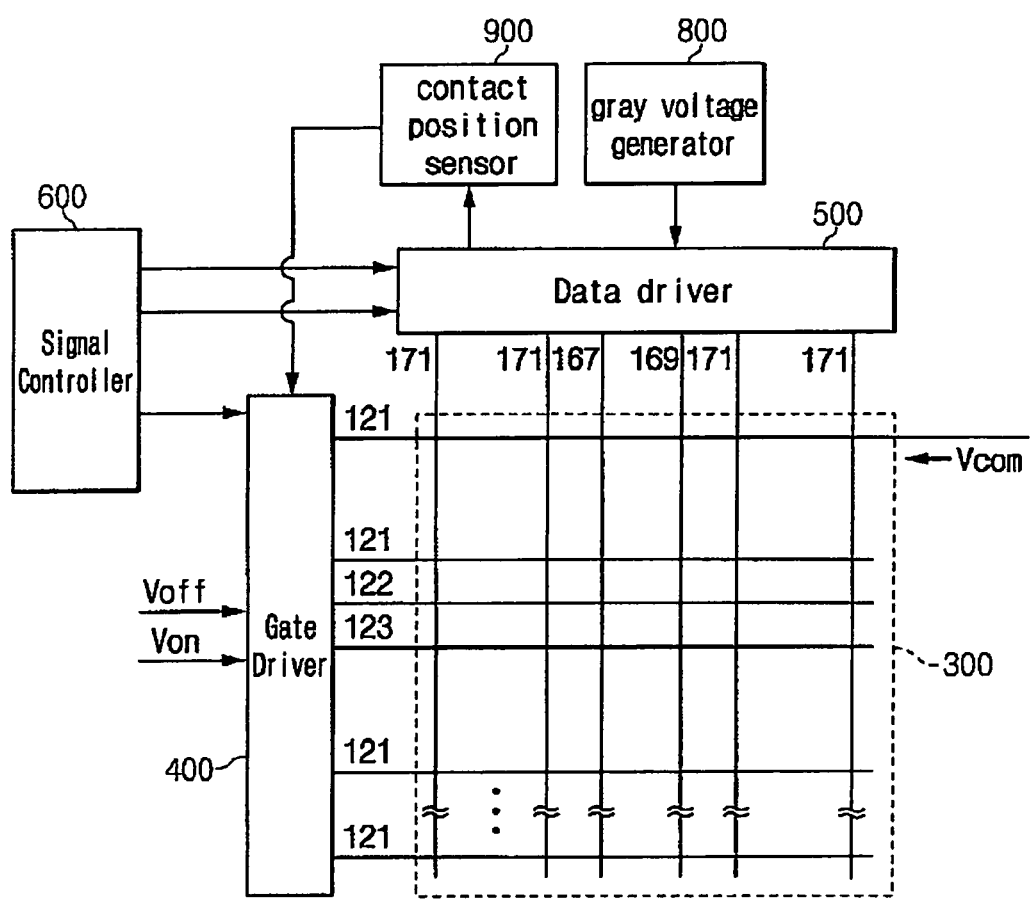
FIG. 1 is a block diagram of an electrophoretic display (EPD) device according to an exemplary embodiment of the present invention.

The present invention will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2:
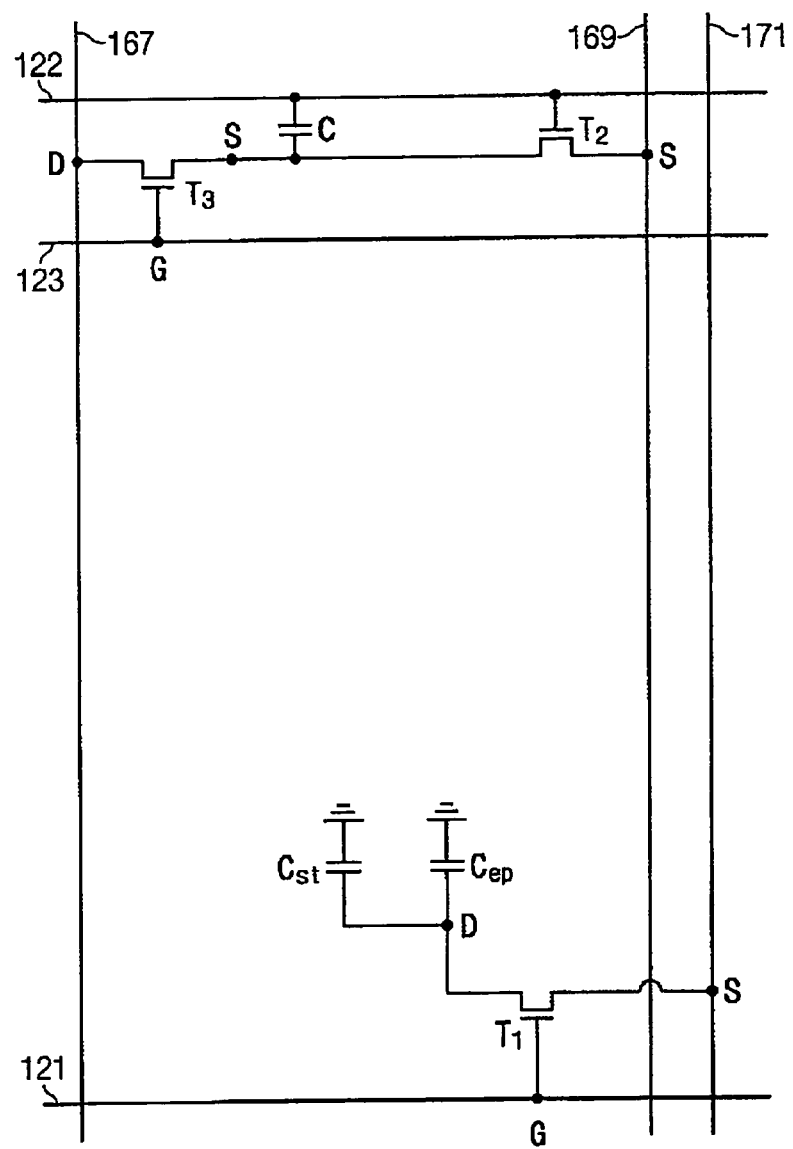
FIG. 2 is an equivalent circuit diagram of a sensor pixel of an EPD device according to an exemplary embodiment of the present invention.
Figure 3:
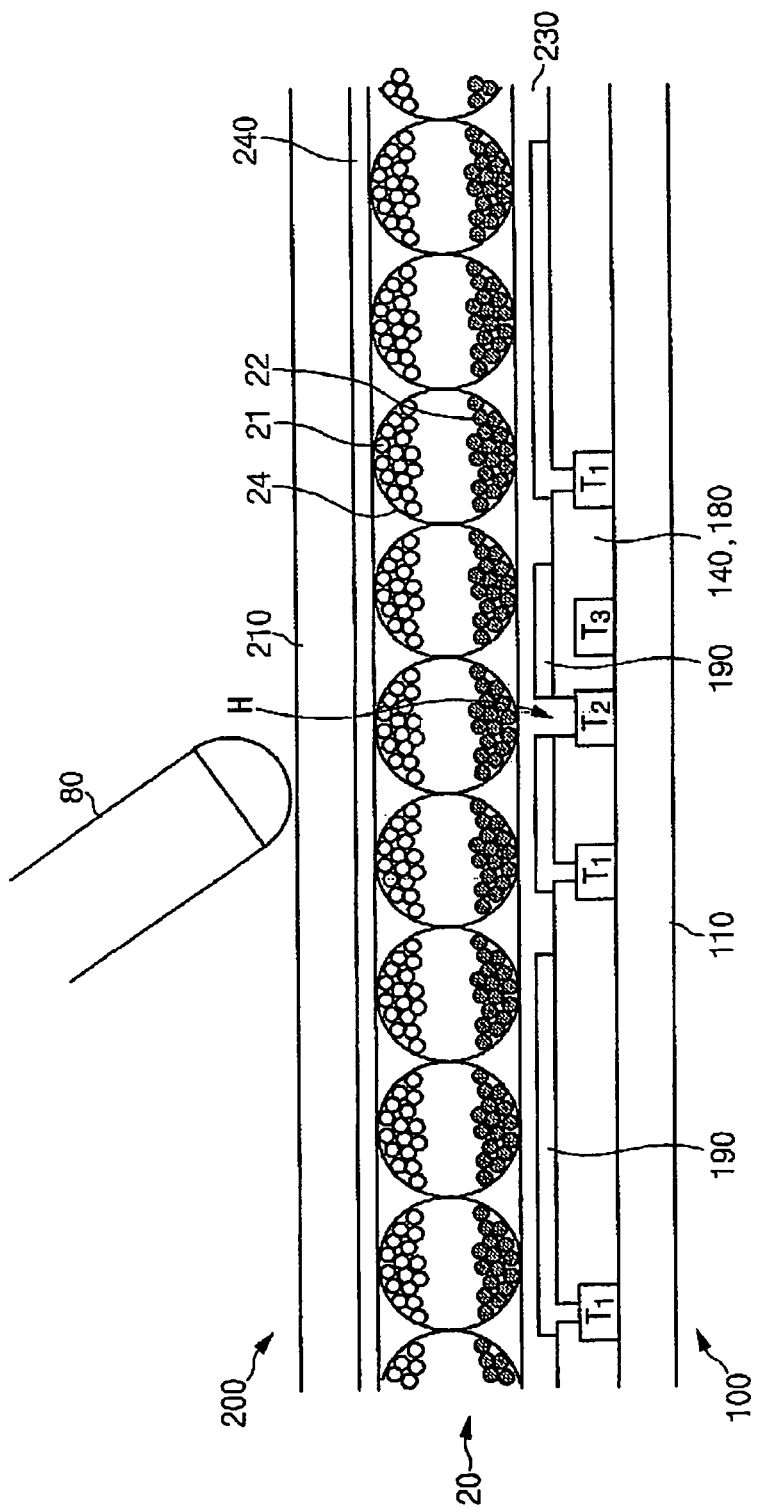
FIG. 3 is a sectional view of an EPD device according to an exemplary embodiment of the present invention.
Figure 4:
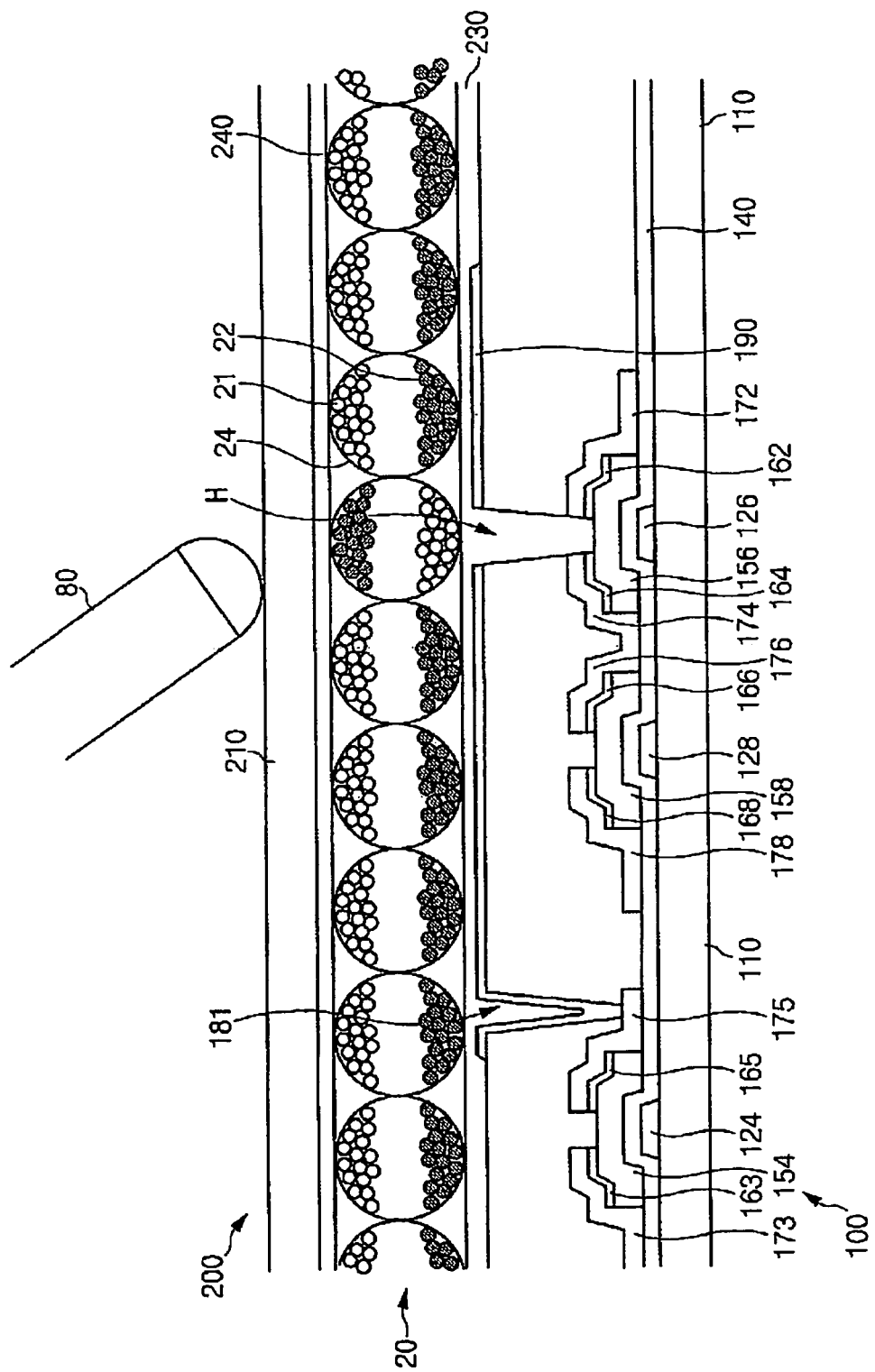
FIG. 4 is a sectional view showing in detail a sensor pixel portion of the EPD device shown in FIG. 3.

FIG. 1 is a block diagram of an electrophoretic display (EPD) device according to an exemplary embodiment of the present invention; FIG. 2 is an equivalent circuit diagram of a sensor pixel of the EPD device in FIG. 1; FIG. 3 is a sectional view of the EPD device according to an exemplary embodiment of the present invention; and FIG. 4 is a sectional view showing in detail a sensor pixel portion of the EPD device shown in FIG. 3.

Referring to FIG. 1, an EPD device according to an exemplary embodiment includes an EPD panel assembly 300, a gate driver 400 and a data driver 500 that are connected to the panel assembly 300, a gray voltage generator 800 connected to the data driver 500, a signal controller 600 controlling the above elements, and a contact position sensor 900.

Still referring to FIG. 1, the panel assembly 300 includes a plurality of display signal lines 121 and 171 and a plurality of pixels connected thereto and arranged substantially in a matrix form. In addition, the EPD device further comprises a plurality of photo sensor lines 122, 123, 167 and 169, and a photo sensor (not shown).

The display signal lines 121 and 171 include a plurality of gate lines 121 transmitting gate signals (also referred to as "scanning signals"), and a plurality of data lines 171 transmitting data signals. The gate lines 121 extend substantially in a row direction and are substantially parallel to each other, while the data lines 171 extend substantially in a column direction and are substantially parallel to each other.

The photo sensor lines 122, 123, 167 and 169 include an off voltage line 122 and an output scanning line 123, which are, for example, parallel to the gate lines 121, and a signal output line 167 and a supply voltage line 169, which are, for example parallel to the data lines 171.

The gray voltage generator 800 generates two sets of gray voltages related to a transmittance of the pixels. The gray voltages in a first set have a positive polarity with respect to a common voltage Vcom, while gray voltages in a second set have a negative polarity with respect to the common voltage Vcom.

The gate driver 400 is connected to the gate lines 121 of the panel assembly 300 and synthesizes the gate-on voltage Von and the gate-off voltage Voff from an external device to generate gate signals for application to the gate lines 121.

The data driver 500 is connected to the data lines 171 of the panel assembly 300 and applies data voltages, which are selected from the gray voltages supplied from the gray voltage generator 800, to the data lines 171. The data driver 500 generally includes a shift resister, latch circuit, digital analog converter and output buffer etc. and includes a plurality of integrated circuits.

The signal controller 600 controls the gate driver 400 and the data driver 500. The gate and data drivers 400 and 500 may include at least one integrated circuit (IC) chip mounted on the EPD panel assembly 300 or on a flexible printed circuit (FPC) film in a tape carrier package (TCP) type, which are attached to the EPD panel assembly 300. Alternatively, the gate and data drivers 400 and 500 may be integrated into the EPD panel assembly 300 along with the display signal lines 121 and 171.

The contact position sensor 900 outputs a photo sensing signal through the output scanning line 123 in regular sequence, receives a signal voltage through the signal output line 167, and outputs a signal having position information responsive to the signal voltage to a center control device (not shown) to supply a new image signal to the EPD device.

Referring to FIGS. 1, 2 and 3, each pixel includes a switching transistor T1 connected to the display signal lines 121 and 171, a photo sensor, an electrophoretic capacitor Cep and a storage capacitor Cst that are connected to the switching transistor T1. If unnecessary, the storage capacitor Cst may be omitted.

The switching transistor T1 includes a thin film transistor (TFT) and is provided on a lower or thin film transistor (TFT) array panel 100 (see FIG. 3). The switching transistor T1 has three terminals: a control terminal G connected to one of the gate lines 121; an input terminal S connected to one of the data lines 171; and an output terminal D connected to both the electrophoretic capacitor Cep and the storage capacitor Cst.

Each photo sensor includes a photo sensing transistor T2, an output transistor T3, and a signal sensing capacitor C. The photo sensing transistor T2 has three terminals: a control terminal G connected to the off voltage line 122; an input terminal S connected to the supply voltage line 169; and an output terminal D connected to a first terminal of the signal sensing capacitor C and an input terminal S of the output transistor T3.

A channel of the photo sensing transistor T2 generates photo current responsive to light incident on the channel. The photo current follows toward the output transistor T3 and the signal sensing capacitor C in response to a supply voltage applied to the supply voltage line 169, and is stored as the signal voltage by the signal sensing capacitor C. A second terminal of the signal sensing capacitor C is connected to the off voltage line 122, and the off voltage line 122 maintains an off voltage to ensure that the signal sensing capacitor C only operates in response to the photo current without an influence from other voltages.

The output transistor T3 has three terminals: a control terminal G connected to the output scanning line 123; and an output terminal D connected to the signal output line 167. In response to an on voltage at the scanning signal line 123, the output transistor T3 outputs the signal voltage stored in the signal sensing capacitor C to the signal output line 167. If necessary, a density of the photo sensors may be regulated.

Referring now to FIGS. 3 and 4, a gate insulating layer 140 and a passivation layer 180 are disposed on the TFT array panel 100, and pixel electrodes 190 are disposed on the passivation layer 180. The pixel electrodes 190 each have a plurality of light transmittance holes on the channel of the photo sensing transistor T2 to maximize light incident on the photo sensing transistor T2.

In an EPD device according to an exemplary embodiment, the TFT array panel 100 includes signal lines, pixel electrodes and thin film transistors connecting respective signal lines and pixel electrodes. The EPD device also includes a common electrode panel 200 including plastic film 210 with a common electrode 240, and a display layer 20 including micro-capsules 24 interposed between the TFT array panel 100 and the common electrode panel 200.

Figure 5:
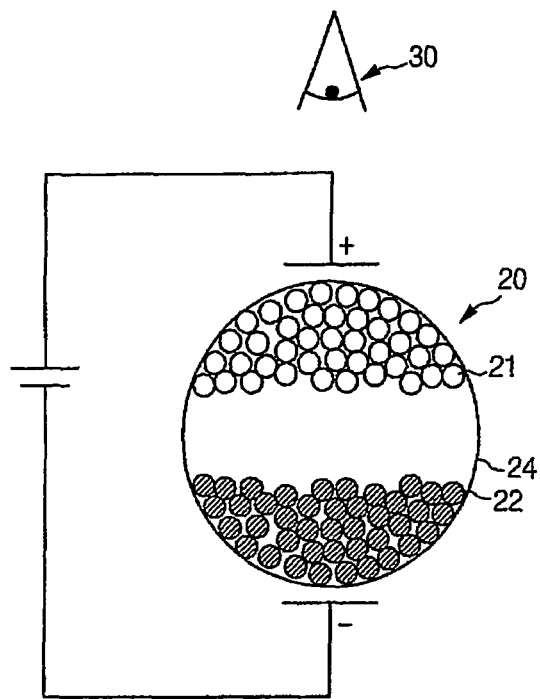
FIG. 5 is a schematic diagram illustrating a driving principle of the EPD device according to an exemplary embodiment of the present invention.
Figure 6:
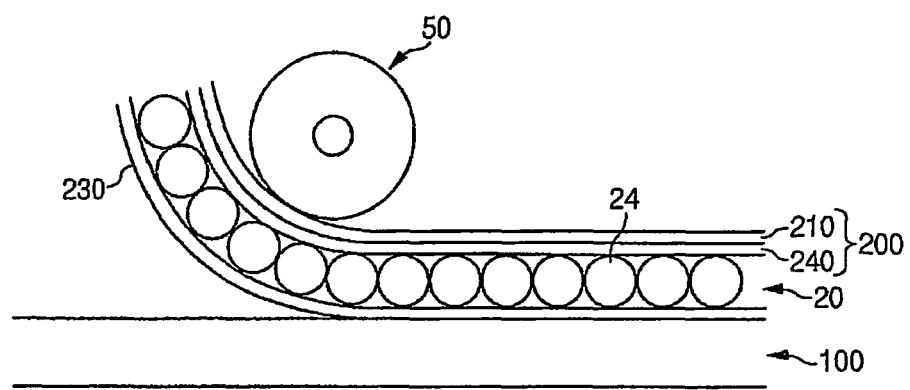
FIG. 6 illustrates a manufacturing method of the EPD device according to an exemplary embodiment of the present invention.

FIG. 5 is a schematic diagram illustrating a driving principle of an EPD device according to an exemplary embodiment of the present invention; and FIG. 6 illustrates a manufacturing method of the EPD device according to an exemplary embodiment of the present invention.

Referring to FIGS. 3, and 5, the EPD device according to this embodiment includes a pair of field-generating electrodes including the pixel and common electrodes 190 and 240 and a display layer 20 interposed between the pixel and common electrodes 190 and 240. The display layer 20 includes the micro-capsules 24 made of electric ink containing negative pigment particles 21 and positive pigment particles 22 that are negatively and positively charged, respectively.

Upon application of a voltage to the pixel and common electrodes 190 and 240, the negative and positive pigment particles 21 and 22 move in opposite directions to color a surface of the micro-capsule 24 such that an observer 30 can see a white or black colored image. In an absence of the voltage to the pixel and common electrodes 190 and 240, the negative and positive pigment particles 21 and 22 are randomly mixed.

Referring to FIG. 3, upon application of the voltage to the pixel and common electrodes 190 and 240, the negative and positive pigment particles 21 and 22 are separated by the voltage applied to the pixel and common electrodes 190 and 240. The negative and positive pigment particles 21 and 22 move in opposite directions toward positive and negative polarity, respectively. The pixel electrode 190 and the common electrode 240 have negative and positive polarities, respectively, in FIG. 3. Accordingly, the negative and positive pigment particles 21 and 22 have moved toward the common electrode 240 and the pixel electrode 190, respectively.

In an EPD device according to an exemplary embodiment of the present invention, a displayed image is maintained for a long time upon removing the voltage from the pixel and common electrodes 190 and 240. Accordingly power consumption of the EPD device is reduced. The EPD device has a good reflection ratio and high contrast. Additionally, because the EPD device includes micro-capsules 24, a wide viewing angle may be achieved.

As shown in FIG. 6, the micro-capsules 24 are dispersed on an adhesive 230 and a front-plane lamination (FPL) is performed in which the adhesive 230, the common electrode panel 240, and the plastic film 210 are coated on a backplane, i.e., the TFT array panel 100 by using a laminator 50.

In a manufacturing method of an EPD device as shown in FIG. 6, the display 20 is formed on the TFT array panel 100 having the thin film transistors through lamination, and consequently the manufacturing method may be simplified.

A structure of an EPD device according to an exemplary embodiment of the present invention will now be described in detail with reference to FIGS. 3 and 4.

FIG. 4 is a sectional view showing in detail the sensor pixel portion of the EPD device shown in FIG. 3;

The EPD device according to this exemplary embodiment includes the TFT array panel 100, the common electrode panel 200, the display layer 20 including the micro-capsules 24 interposed between the TFT array and common electrode panels 100 and 200, and the adhesive 230 for combining the TFT array and common electrode panels 100 and 200. The EPD device includes gate lines 121 and gate electrodes 124 of the switching transistor T1 connected to the gate lines 121, the off voltage line 122 and a gate electrode 126 of the photo sensing transistor T2 connected to the off voltage line 122, and the output scanning line 123 and a gate electrode 128 of the output transistor T3 connected to the output scanning line 123 disposed on an insulating substrate 110.

The gate lines 121 are preferably made of an Al containing metal such as Al and Al alloy, an Ag containing metal such as Ag and Ag alloy, a Cu containing metal such as Cu and Cu alloy, Cr, Mo, Mo alloy, Ta, or Ti. The gate lines 121 may have a multi-layered structure including at least two films, for example, a lower film and an upper film having different physical characteristics. The upper film is preferably made of low resistivity metal such as Al containing metal, Ag containing metal, and Cu containing metal for reducing signal delay or voltage drop in the gate lines 121. On the other hand, the lower film is preferably made of material such as Cr, Mo, Mo alloy, Ta and Ti, which has good physical, chemical, and electrical contact characteristics.

The gate insulating layer 140 preferably made of silicon nitride (SiNx) is formed on the gate lines 121, the off voltage line 122, the output scanning line 123 and the gate electrodes 124, 126 and 128.

A plurality of semiconductor layers 154, 156 and 158 preferably made of hydrogenated amorphous silicon (abbreviated to "a-Si") or polysilicon are formed on the gate insulating layer 140. The channels of three transistors T1, T2 and T3 are formed into the semiconductor layers 154, 156 and 158, respectively.

A plurality of ohmic contact layers 163, 165, 162, 164, 166 and 168 preferably made of silicide or n+ hydrogenated a-Si heavily doped with n type impurity are formed on the semiconductor layers 154, 156 and 158, respectively. The ohmic contact layers 163, 165, 162, 164, 166 and 168 are located in pairs on the semiconductor layers 154, 156 and 158, respectively.

The data lines 171, the signal output line 167, the supply voltage line 169, and source electrodes 173, 172, 176 and drain electrodes 175, 174, 178 of the three transistors T1, T2, and T3 are disposed on the ohmic contact layers 163, 165, 162, 164, 166 and 168. The source electrode 173 of the switching transistor T1 is electrically connected to the data line 171, the source electrode 172 of the photo sensing transistor T2 is electrically connected to the supply voltage line 169, and the drain electrode 178 of the output transistor T3 is electrically connected to the signal output line 167. Additionally, the drain electrode 174 of the sensing transistor T2 is electrically connected to the source electrode 176 of the output transistor T3, and the drain electrode 175 of the switching transistor T1 is electrically connected to the pixel electrode 190.

The data lines 171 for transmitting data voltages extend substantially in the column direction and intersect the gate lines 121. A plurality of branches of each data line 171, which project toward the drain electrodes 175, form the source electrodes 173, 172 and 176. Referring, for example, to the switching transistor T1, each pair of the source electrodes 173 and the drain electrodes 175 are separated from each other and opposite each other with respect to the gate electrode 124.

The data lines 171 and the drain electrodes 175, 174, 178 include a layer having low resistivity material including Al or Ag, and good physical, chemical, and electrical contact characteristics.

A passivation layer 180 is formed on the data lines 171, the signal output line 167, the supply voltage line 169, and the source electrodes 173, 172, 176 and the drain electrodes 175, 174, 178.

The passivation layer 180 has a contact hole 181 exposing the drain electrode 175 of the switching transistor T1, and a light transmittance hole H exposing the channel of the photo sensing transistor T2.

The pixel electrodes 190, which are preferably made of reflective metal such as Al and Ag, are formed on the passivation layer 180. The pixel electrodes 190 are physically and electrically connected to the drain electrode 175 through the contact hole 181. The pixel electrodes 190 also expose the light transmittance hole H.

Since the pixel electrodes 190 have a plurality of light transmittance holes H on the channel of the photo sensing transistor T2, light incident on the photo sensing transistor T2 may be maximized. Thus, a shadow type EPD device is possible, which uses reflected light instead of a backlight unit.

In the shadow type EPD device, if an object or body 80 such as a finger is placed on a surface of the EPD device, light incident on the EPD device at the position of the body 80 is prevented. Therefore, the photo sensing transistors T2 over which the body 80 is placed turn off and photo current in the corresponding photo sensing transistors T2 is not generated such that the signal voltage is not stored in the signal sensing capacitor C. Photo sensing transistors T2 over which the body 80 is not placed remain on and photo current is generated corresponding to an amount of received light, and the signal voltage is stored in the signal sensing capacitors C connected to the photo sensing transistors T2 that are on. At this time, an amount of light incident on the channel of the photo sensing transistors T2 must be enough to maintain the photo sensing transistors T2 on.

In this state, the scanning signal is applied to the output scanning line 123 in regular sequence, and the signal voltage stored in the signal sensing capacitor C is output to the contact position sensor 900 through the signal output line 167. Thus, a position touched by the body 80 is recognized.

In the common electrode panel 200 facing the TFT array panel 100, the common electrode 240 is disposed on an entire surface of the plastic film 210 facing the lower insulating substrate 110. The common electrode 240 is made of transparent material, and forms an electric field to drive the negative and positive pigment particles 21 and 22 along with the pixel electrode 190.

When a touch panel of a resistance layer type is formed on an external surface of the EPD device, many problems are generated such as high cost, low productivity, lower reflection brightness by the touch panel and a reduction of white colored brightness. To solve these problems, the photo sensor transistors are disposed at an inner part of the EPD device as in the present invention, and a thinner display with a low cost may be provided.

A reflection ratio of the EPD device is in a range of about 30% to about 50% compared with a liquid crystal display, which is in a range of about 10%. Accordingly, it is preferable that the photo sensor transistors of a shadow type EPD device are used, since it is easy to regulate photo sensitivity using the photo sensor transistors.

Because the EPD device is a shadow type, consideration of aperture ratio may be omitted compared with transmission or translucent type liquid crystal display devices having a photo sensor transistor. Accordingly, the photo sensor transistor may be formed on an entire pixel unit, and large scale production of photo sensor transistors may be possible.

The EPD device according to the present invention prevents weight and thickness of a display device from increasing due to using a touch panel, because the EPD device includes the photo sensor transistors outputting a signal having position information by sensing the light incident on the panel along with pixels for images. Furthermore, the display device using the touch panel including the photo sensor transistor may display characters or graphics with accuracy.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrophoretic display device, comprising:
a thin film transistor array panel including a substrate, gate lines and data lines formed on the substrate and crossing each other, switching thin film transistors electrically connected to the gate and data lines, an off voltage line disposed in parallel with the gate lines and insulated from the data lines, a supply voltage line disposed in parallel with the data lines and insulated from the gate lines and the off voltage line, a photo sensor formed on the substrate, and pixel electrodes electrically connected to the switching thin film transistors;
a common electrode panel facing the thin film transistor array panel and having a common electrode; and
a display layer disposed between the thin film transistor array panel and the common electrode panel,
wherein the display layer includes electric ink containing separately disposed negatively charged pigment particles and positively charged pigment particles,
wherein the photo sensor includes a photo sensing transistor and a signal sensing capacitor, wherein the photo sensing transistor has an output terminal connected to the signal sensing capacitor, a control terminal connected to the off voltage line, and an input terminal directly connected to the supply voltage line, and is turned on by light incident on a channel of the photo sensing transistor,
wherein the signal sensing capacitor has a first terminal connected to the output terminal of the photo sensing transistor and a second terminal connected to the off voltage line, and
wherein each of the pixel electrodes have a light transmissive hole exposing the channel of the photo sensing transistor.

2. The electrophoretic display device of claim 1, further comprising:
an output scanning line disposed parallel to the gate lines and insulated from the data lines; and
a signal output line disposed parallel to the data lines and insulated from the gate lines, the off voltage line and the output scanning line,
wherein the photo sensor further includes an output transistor having an input terminal connected to the output terminal of the photo sensing transistor and one terminal of the signal sensing capacitor, an output terminal connected to the signal output line, and a control terminal connected to the output scanning line.

3. The electrophoretic display device of claim 2, further comprising:
a gate insulating layer insulating the gate lines and the data lines from each other line; and
a passivation layer formed on the photo sensing transistor, the output transistor and each switching thin film transistor, and having a light transmissive hole exposing the channel of the photo sensing transistor.

4. The electrophoretic display device of claim 2, wherein the photo sensing transistor is configured to turn off responsive to an object at a surface of the electrophoretic display.

5. The electrophoretic display device of claim 4, wherein the photo sensor is configured to communicate a position of the object at the surface of the display device to a contact position sensor.

6. The electrophoretic display device of claim 1, further comprising:
a gate insulating layer insulating the gate lines and the data lines from each other line; and
a passivation layer formed on a photo sensing transistor of the photo sensor, an output transistor and each switching thin film transistor, and having a light transmissive hole exposing a channel of the photo sensing transistor.

7. The electrophoretic display device of claim 1, wherein the pixel electrode includes a reflective conductive material.

* * * * *